US012336049B2

(12) United States Patent
Abtin et al.

(10) Patent No.: US 12,336,049 B2
(45) Date of Patent: Jun. 17, 2025

(54) NETWORK NODE, USER EQUIPMENT, AND METHODS PERFORMED IN A COMMUNICATION NETWORK

(71) Applicant: Telefonaktiebolaget LM Ericsson (publ), Stockholm (SE)

(72) Inventors: Afshin Abtin, Sollentuna (SE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 385 days.

(21) Appl. No.: 17/908,045

(22) PCT Filed: Mar. 23, 2020

(86) PCT No.: PCT/SE2020/050303
§ 371 (c)(1),
(2) Date: Aug. 30, 2022

(87) PCT Pub. No.: WO2021/194398
PCT Pub. Date: Sep. 30, 2021

(65) Prior Publication Data
US 2023/0089553 A1    Mar. 23, 2023

(51) Int. Cl.
*H04W 76/50*    (2018.01)
*H04W 4/90*    (2018.01)
*H04W 48/18*    (2009.01)

(52) U.S. Cl.
CPC .............. *H04W 76/50* (2018.02); *H04W 4/90* (2018.02); *H04W 48/18* (2013.01)

(58) Field of Classification Search
CPC ....... H04W 76/50; H04W 4/90; H04W 48/18; H04W 48/20

USPC ....................................................... 455/404.1
See application file for complete search history.

(56) References Cited

U.S. PATENT DOCUMENTS

| 9,462,443 | B2 * | 10/2016 | Turina | ................... H04W 4/90 |
| 2006/0121877 | A1 * | 6/2006 | Raghuram | ............ H04W 76/50 |
| | | | | 455/404.1 |
| 2010/0255807 | A1 | 10/2010 | Umatt et al. | |
| 2015/0065143 | A1 | 3/2015 | Hsu et al. | |
| 2017/0026248 | A1 * | 1/2017 | Holmqvist | ........... H04B 17/309 |
| 2017/0374635 | A1 * | 12/2017 | Islam | .................. H04W 60/00 |

(Continued)

FOREIGN PATENT DOCUMENTS

WO    WO 2018/176741 A1    10/2018

OTHER PUBLICATIONS

International Search Report and Written Opinion of the International Searching Authority, PCT/SE2020/050303, mailed Dec. 8, 2020, 8 pages.

(Continued)

*Primary Examiner* — Don N Vo
(74) *Attorney, Agent, or Firm* — Sage Patent Group

(57) ABSTRACT

Embodiments herein relate to e.g. a method performed by a user equipment, UE, for handling a service in a wireless communication network. The UE perform, upon handling an emergency service, a connection to a second cell of a second RAT for handling the emergency service, and performs the emergency service in the second cell of the second RAT. The UE then stays connected in the second cell of the second RAT for a time interval relating to initiation of the emergency service or finalization of the emergency service.

20 Claims, 15 Drawing Sheets

(56) References Cited

U.S. PATENT DOCUMENTS

2019/0044779 A1* 2/2019 Wu .................. H04W 72/1215
2021/0153087 A1* 5/2021 Lee ...................... H04W 36/08

OTHER PUBLICATIONS

"3rd Generation Partnership Project; Technical Specification Group Services and System Aspects; Service requirements for the 5G system; Stage 1 (Release 17)", 3GPP TS 22.261, Sep. 2019, 83 Pages.

"3rd Generation Partnership Project; Technical Specification Group Services and System Aspects; System Architecture for the 5G System (5GS); Stage 2 (Release 16)", 3GPP TS 23.501, Sep. 2019, 391 Pages.

"3rd Generation Partnership Project; Technical Specification Group Services and System Aspects; Procedures for the 5G System (5GS); Stage 2 (Release 16)", 3GPP TS 23.502, Sep. 2019, 525 Pages.

* cited by examiner

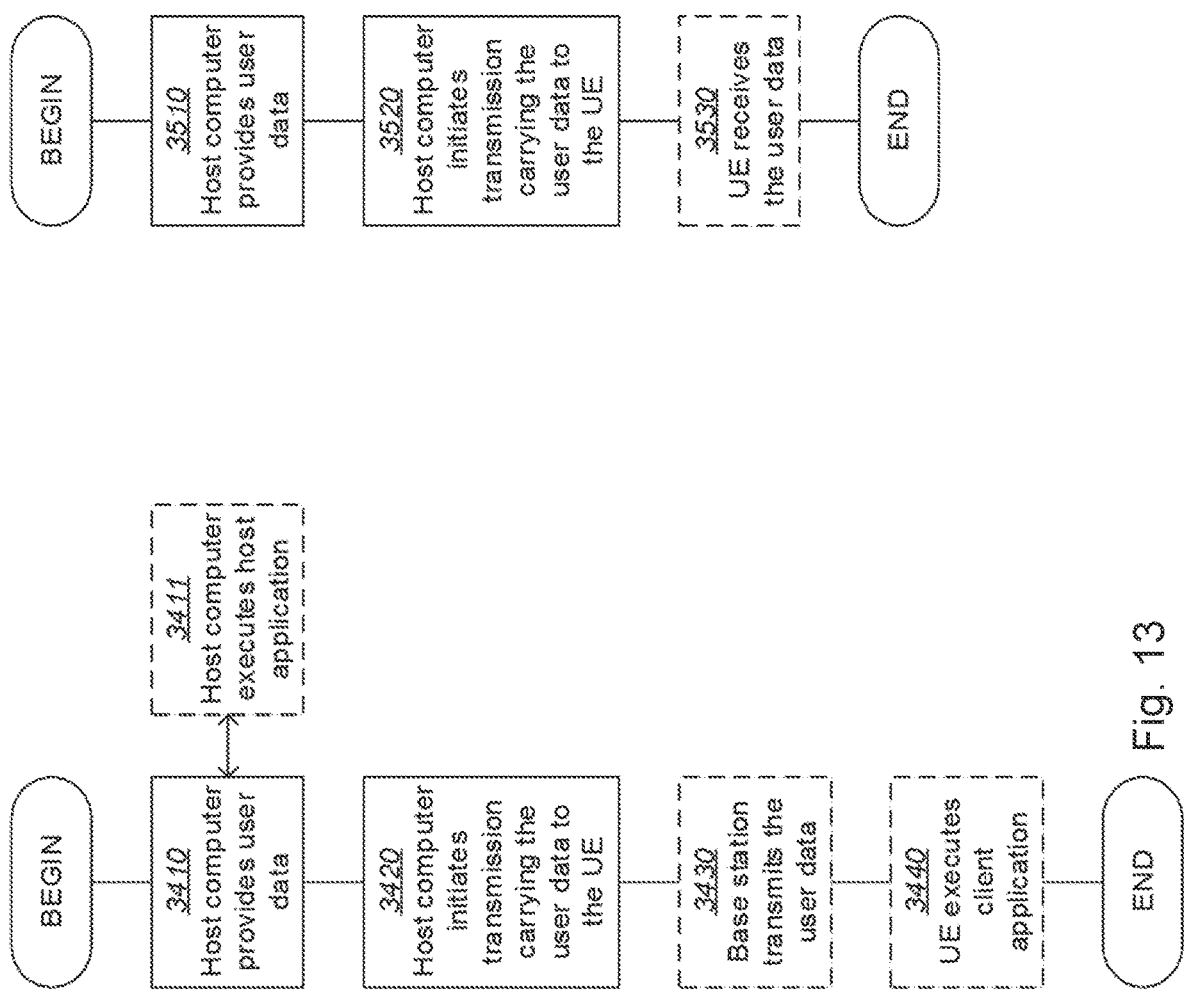

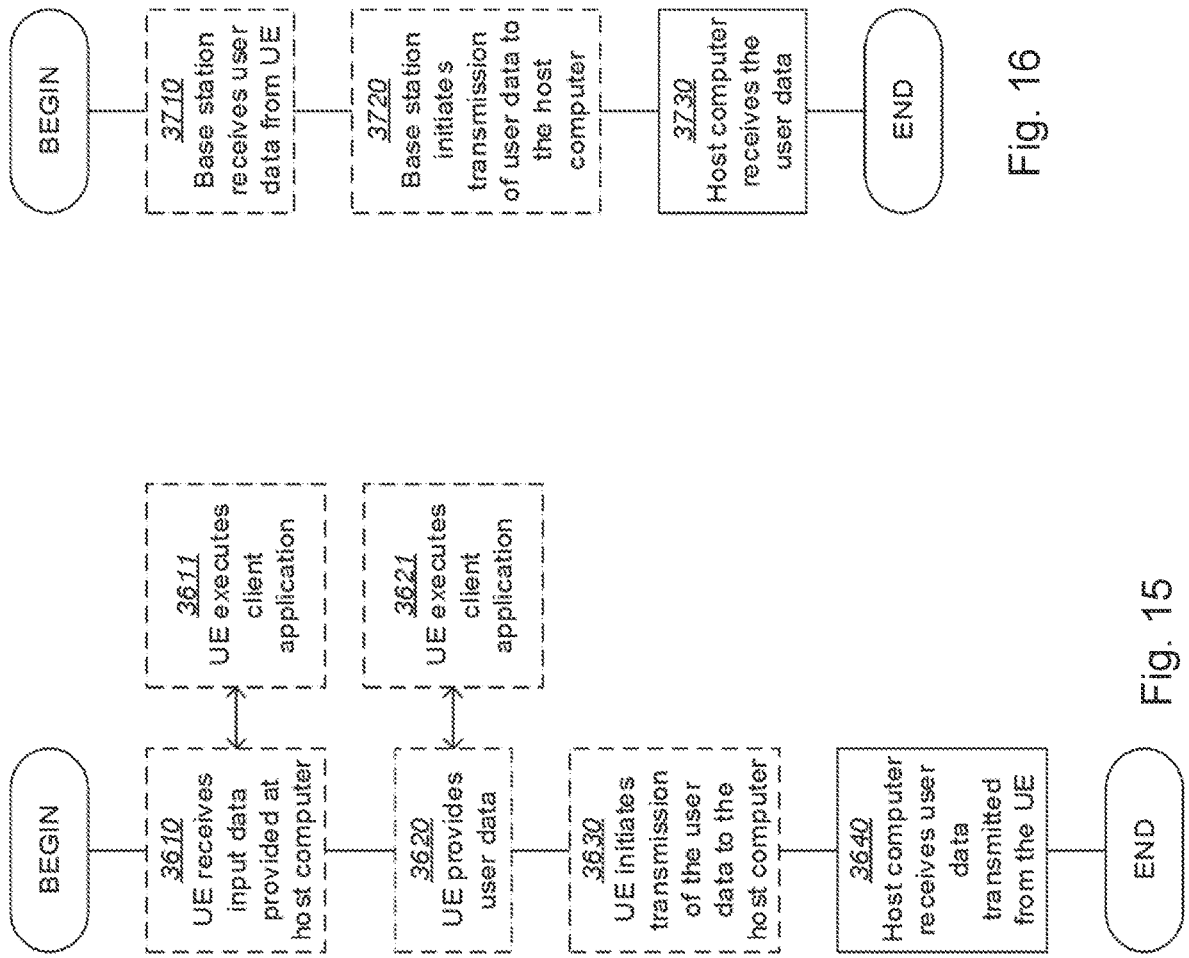

NETWORK NODE, USER EQUIPMENT, AND METHODS PERFORMED IN A COMMUNICATION NETWORK

CROSS REFERENCE TO RELATED APPLICATIONS

This application is a 35 U.S.C. § 371 national stage application of PCT International Application No. PCT/SE2020/050303 filed on Mar. 23, 2020, the disclosure and content of which is incorporated by reference herein in its entirety.

TECHNICAL FIELD

Embodiments herein relate to a network node, a user equipment (UE), and methods performed therein regarding communication in a wireless communication network. Furthermore, a computer program product and a computer-readable storage medium are also provided herein. Especially, embodiments herein relate to handling or enabling communication, e.g. handling emergency calls, in the wireless communication network.

BACKGROUND

In a typical wireless communication network, UEs, also known as wireless communication devices, mobile stations, stations (STA) and/or wireless devices, communicate via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the UEs within range of the access node. The radio network node communicates over a downlink (DL) to the UE and the UE communicates over an uplink (UL) to the radio network node. The radio network node may be a distributed node comprising a remote radio unit and a separated baseband unit.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with UEs. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio NR, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

5G is the fifth generation of cellular technology and was introduced in Release 15 of the 3GPP standard. It is designed to increase speed, reduce latency, and improve flexibility of wireless services. The 5G system (5GS) includes both a new radio access network (NG-RAN) and a new core network (5GC).

5G is designed to support new use case requiring ultra-reliable low-latency communication (URLLC) such as factory automation and autonomous driving. To be able to meet the stringent requirements on reliability and latency also during mobility, two new handover types are introduced in 5G Release 16 called make-before-break handover and conditional handover. These will be described in more detail below after a review of the NG-RAN architecture and the legacy handover procedure.

Overview of the NG-RAN architecture.

Similar to E-UTRAN in 4G, the NG-RAN uses a flat architecture and consists of base stations, called gNBs, which are interconnected with each other by means of the Xn-interface. The gNBs are also connected by means of the NG interface to the 5GC, more specifically to the Access and Mobility Function (AMF) by the NG-C interface and to the User Plane Function (UPF) by means of the NG-U interface. The gNB in turn supports one or more cells which provides the radio access to the UE. The radio access technology, called New Radio (NR) is orthogonal frequency-division multiplexing (OFDM) based like in LTE and offers high data transfer speeds and low latency. Note that NR is sometimes used to refer to the whole 5G system although it is strictly speaking only the 5G radio access technology.

It is expected that NR will be rolled out gradually on top of the legacy LTE network starting in areas where high data traffic is expected. This means that NR coverage will be limited in the beginning and users must move between NR and LTE as they go in and out of coverage. To support fast mobility between NR and LTE and avoid change of core network, LTE eNBs will also connect to the 5G-CN and support the Xn interface. An eNB connected to 5GC is called a next generation eNB (ng-eNB) and is considered part of the NG-RAN.

The 5G core (5GC) and NR are introduced and specified in 3GPP TS 23.501 v.15.0.0 and TS 23.502 v.15.0.0. Additionally, Emergency Service fallback is specified in 3GPP TS 23.502 v.15.0.0, section 4.13.4.2. See also TS 24.501 v.15.0.0 for the NAS procedures, see FIG. 1. It implies that while UE is camping on NR/5GC, but native Emergency call over NR is not supported and therefore the emergency call will be provided by EPS (LTE/EPC) network. This enables operators to deploy 5GC/NR early and gradually build up the needed coverage and support for emergency call over NR.

Emergency calls reaching an emergency center may be subject to location query from emergency center to network, to find the subscribers position. This model also enables operators to introduce 5GC/NR before all positioning methods are enabled and supported on NR in the network. This is as any positioning/location query from emergency center during the emergency call will be applied on LTE/EPC and will not affect the 5GC and NR.

For this purpose, 3GPP defined above mechanism where the UE will receive a specific indication from network indicating that Emergency Fallback is supported while the indication for Emergency call over NR will be indicating it is not supported and when the subscriber dials an emergency number, e.g. 911, the UE considering the first indication will perform the mentioned procedure, referred to as Service Request and moved by network to EPS to place the emergency call. The mentioned indicators are provided from NW to UE during 5GC Registration procedures, TS 23.502, v.15.0.0 section 4.2.2.

The UE on EPS will setup an Emergency packet data network (PDN) connection, perform an IMS Emergency Registration and set up an emergency call. See further 3GPP TS 23.167 v.15.0.0. A location query during an emergency call would be based on 3GPP TS 23.271 v.15.0.0, section 9.1.16.

SUMMARY

There are some regulatory bodies in some countries like Japan that require that such location or positioning queries need to be possible to take place several seconds after the emergency call has been finalized. However, the UE may have already moved back to 5GC and then such query would imply again the need for Location services and positioning capabilities on NR and 5GC, which are not supported. Hence the regulatory requirement cannot be fulfilled.

An object of embodiments herein is to provide a mechanism that improves communication in the wireless communication network.

According to an aspect the object is achieved by providing a method performed by a UE for handling a service in a wireless communication network. The UE, upon handling an emergency service, performs a connection to a second cell of a second RAT for handling the emergency service. The UE further performs the emergency service in the second cell of the second RAT; and stays connected in the second cell of the second RAT for a time interval relating to initiation of the emergency service or finalization of the emergency service.

According to an aspect the object is achieved by providing a method performed by a network node for handling a service for a UE in a wireless communication network. The network node is associated with a second cell of a second RAT out of cells of at least a first RAT and a second RAT, and the UE is connected to the second cell of the second RAT. The network node performs or provides an emergency service for the UE in the second cell of the second RAT. The network node further transmits, to the UE, an indication indicating a time interval relating to initiation of the emergency service or finalization of the emergency service, and/or the use of the time interval, wherein the time interval is used by the UE for staying connected in the second cell of the second RAT for the time interval.

It is furthermore provided herein a computer program product comprising instructions, which, when executed on at least one processor, cause the at least one processor to carry out any of the methods above, as performed by the network node or the UE, respectively. It is additionally provided herein a computer-readable storage medium, having stored thereon a computer program product comprising instructions which, when executed on at least one processor, cause the at least one processor to carry out the method according to any of the methods above, as performed by the network node or the UE, respectively.

According to still another aspect the object is achieved by providing a UE for handling a service in a wireless communication network. The UE is configured to perform, upon handling an emergency service, a connection to a second cell of a second RAT for handling the emergency service; and to perform the emergency service in the second cell of the second RAT. The UE is further configured to stay connected in the second cell of the second RAT for a time interval relating to initiation of the emergency service or finalization of the emergency service.

According to yet another aspect the object is achieved by providing a network node for handling a service for a UE in a wireless communication network. The network node is associated with a second cell of a second RAT out of cells of at least a first RAT and a second RAT, and the UE is connected to the second cell of the second RAT. The network node is configured to perform or provide an emergency service for the UE in the second cell of the second RAT. The network node is further configured to transmit, to the UE, an indication indicating a time interval relating to initiation of the emergency service or finalization of the emergency service, and/or the use of the time interval, wherein the time interval is used by the UE for staying connected in the second cell of the second RAT for the time interval.

Embodiments herein relate to methods and apparatus for handling emergency calls when being enables to connect to different RATs. The solution is considering the network capabilities and lack of support for Location services and positioning in 5G system (5GS) and NR and to keep the UE on evolved packet system (EPS) for a time interval e.g. an operator specific time.

Embodiments herein enable to roll out 5GC and NR and evolve the network gradually to support Emergency call over NR and related Location services/positioning without conflict with regulatory requirements.

BRIEF DESCRIPTION OF THE DRAWINGS

Embodiments will now be described in more detail in relation to the enclosed drawings, in which:

FIG. 13 shows methods implemented in a communication system including a host computer, a base station and a user equipment in accordance with some embodiments;

FIG. 14 shows methods implemented in a communication system including a host computer, a base station and a user equipment in accordance with some embodiments;

FIG. 15 shows methods implemented in a communication system including a host computer, a base station and a user equipment in accordance with some embodiments; and FIG. 16 shows methods implemented in a communication system including a host computer, a base station and a user equipment in accordance with some embodiments.

DETAILED DESCRIPTION

Embodiments herein are described in the context of 5G/NR and LTE but the same concept can also be applied to other wireless communication system such as 4G/LTE and UMTS. Embodiments herein may be described within the context of 3GPP NR radio technology, e.g. using gNB as the radio network node. It is understood, that the problems and solutions described herein are equally applicable to wireless access networks and user equipments (UE) implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1:
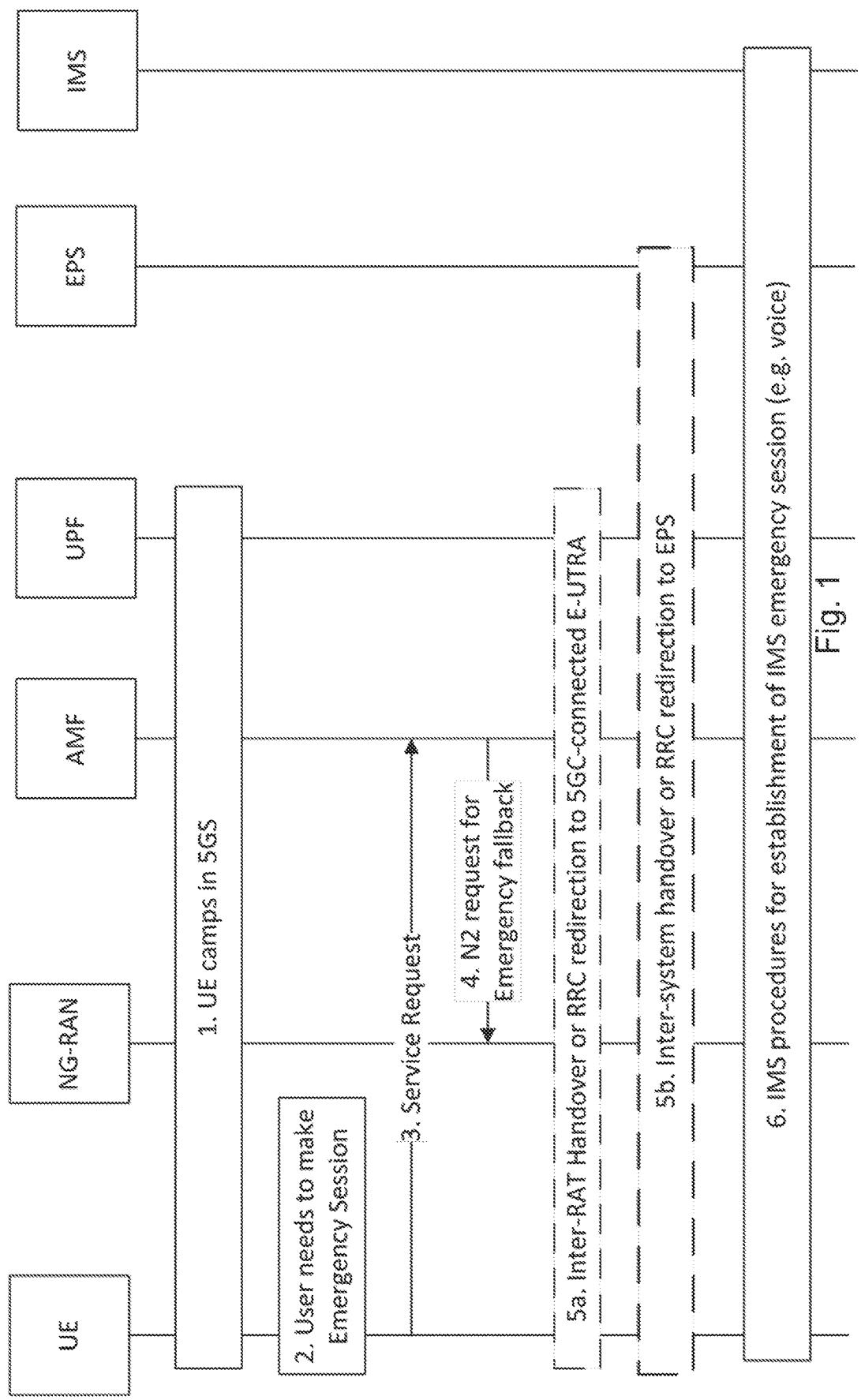
FIG. 1 shows a procedure for establishing an emergency service according to prior art.
Figure 2:
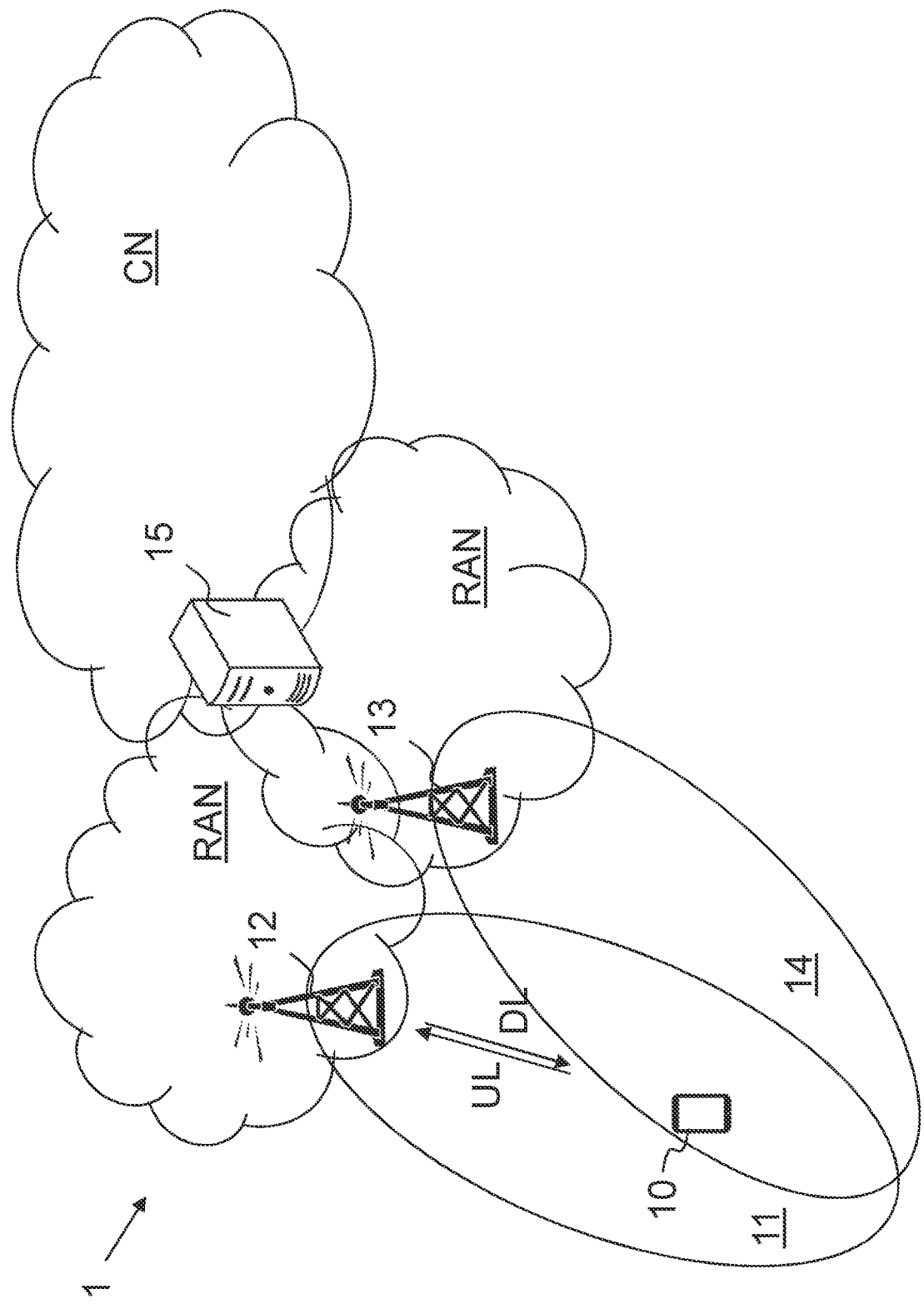
FIG. 2 shows a wireless communication network according to embodiments herein.

Embodiments herein relate to wireless communication networks in general. FIG. 2 is a schematic overview depicting a wireless communication network 1. The wireless communication network 1 comprises e.g. one or more RANs and one or more CNs. The wireless communication network 1 may use one or a number of different technologies, such as Wi-Fi, Long Term Evolution (LTE), LTE-Advanced, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in 5G systems in combination with LTE, however, embodiments are also applicable in further development of the existing communication systems such as e.g. a WCDMA/LTE system.

In the wireless communication network 1, wireless devices e.g. a UE 10 such as a mobile station, a non-access point (non-AP) station (STA), a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, internet of things (IoT) operable device, or node e.g. smart phone, laptop, mobile phone, sensor, relay, mobile tablets or even a small base station capable of communicating using radio communication with a network node within an area served by the network node.

The communication network 1 comprises a first radio network node 12 providing e.g. radio coverage over a geographical area, a first service area 11 i.e. a first cell, of a radio access technology (RAT), such as NR, LTE, Wi-Fi, WiMAX or similar. The first radio network node 12 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The first radio network node 12 may alternatively or additionally be a controller node or a packet processing node or similar. The first radio network node 12 may be referred to as source access node or a serving network node wherein the first service area 11 may be referred to as a serving cell, source cell or primary cell, and the first radio network node communicates with the UE 10 in form of DL transmissions to the UE 10 and UL transmissions from the UE 10. The first radio network node may be a distributed node comprising a baseband unit and one or more remote radio units.

The communication network 1 comprises a second radio network node 13 providing e.g. radio coverage over a geographical area, a second service area 14 i.e. a second cell, of a radio access technology (RAT), such as NR, LTE, Wi-Fi, WiMAX or similar. The second radio network node 13 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The second radio network node 13 may alternatively or additionally be a controller node or a packet processing node or similar. The second radio network node 13 may be referred to as a target access node or a target network node wherein the second service area 14 may be referred to as a target cell or secondary cell, and the second radio network node 13 communicates with the UE 10 in form of DL transmissions to the UE 10 and UL transmissions from the UE 10. The second radio network node may be a distributed node comprising a baseband unit and one or more remote radio units. The first RAT is different than the second RAT.

It should be noted that a service area may be denoted as cell, beam, beam group or similar to define an area of radio coverage. It should further be noted that the first and second cell may be provided by the same first radio network node 12.

The communication network may further comprise a gateway node 15, e.g. a Packet Data Network Gateway (PGW), being an example of a network node in the communication network. The gateway node and the radio network nodes are examples of a network node according to embodiments herein.

It is herein disclosed a methods where the UE 10 is connected to the second RAT for a time interval during or after performing an emergency service in the second RAT. This may e.g. be based on one or several of following:

1. UE started on e.g. 5GC/NR, received Emergency Service fallback indicator and placed an emergency call using the Service Request procedure and moved by network to EPS—Once the emergency call is finalized, the UE 10 stays on EPS for x seconds (e.g. 20-200 sec) considering the 5GC indicated "Emergency Service fallback".
2. UE is configured by operator specific timer value that for any emergency call attempt on e.g. EPS, stay on EPS for x seconds after the call. If there is agreement in the industry to have a fixed value for this timer, then also this fixed value can be used without the need for specific configuration of the UE, or the UE uses the fixed value if such configuration hasn't taken place.
3. Alternatively, the UE may take into account whether an emergency PDN connection hasn't been released by the network. As long as the network node has not deactivated the emergency PDN connection, the UE may not reselect to another access. The emergency PDN connection is released by the PGW (or a network function having PGW functionality). In an advanced embodiment, the PGW releases the emergency PDN connection with the "stay in EPS" indication, instructing thereby the UE to stay in EPS even if the emergency PDN connection has been released. This "stay on EPS" indication is carried to the radio network node such as the second radio network node 13 and forwarded to the UE 10. The "stay on EPS" indication may be accompanied by a timer value indicating a minimal time the UE 10 is to stay on EPS. If the UE 10 is provided by the network with the timer value, then the UE 10 may use this timer value to determine on how long to stay on EPS even after the emergency PDN connection has been released.
4. Alternatively, the UE 10 may take into account both whether the emergency PDN connection has not been released and whether the operator specific timer has not expired. Whichever event takes place earlier allows the UE 10 to leave EPS.

The solution proposal 1 is applicable to e.g. 5GS UEs and the scenario when the UE 10 is camping on a first RAT such as 5GS and Emergency service fallback to the second RAT such as EPS.

Solution proposal 2 is applicable to e.g. 5GS UE that is camping on the second RAT such as LTE/EPC and after call completion on LTE/EPC uses the timer to stay on EPS.

Solution 3 implies UEs such as a 5GS UE considering existence of Emergency PDN connection on e.g. LTE/EPC and possibly receives an indication and/or timer from network when emergency PDN connection is released to stay on EPS.

Solution 4 is a combination of 2 and 3.

Thereby embodiments herein enable services related to the emergency service such as location and/or positioning of the UE in the second RAT.

Figure 3:
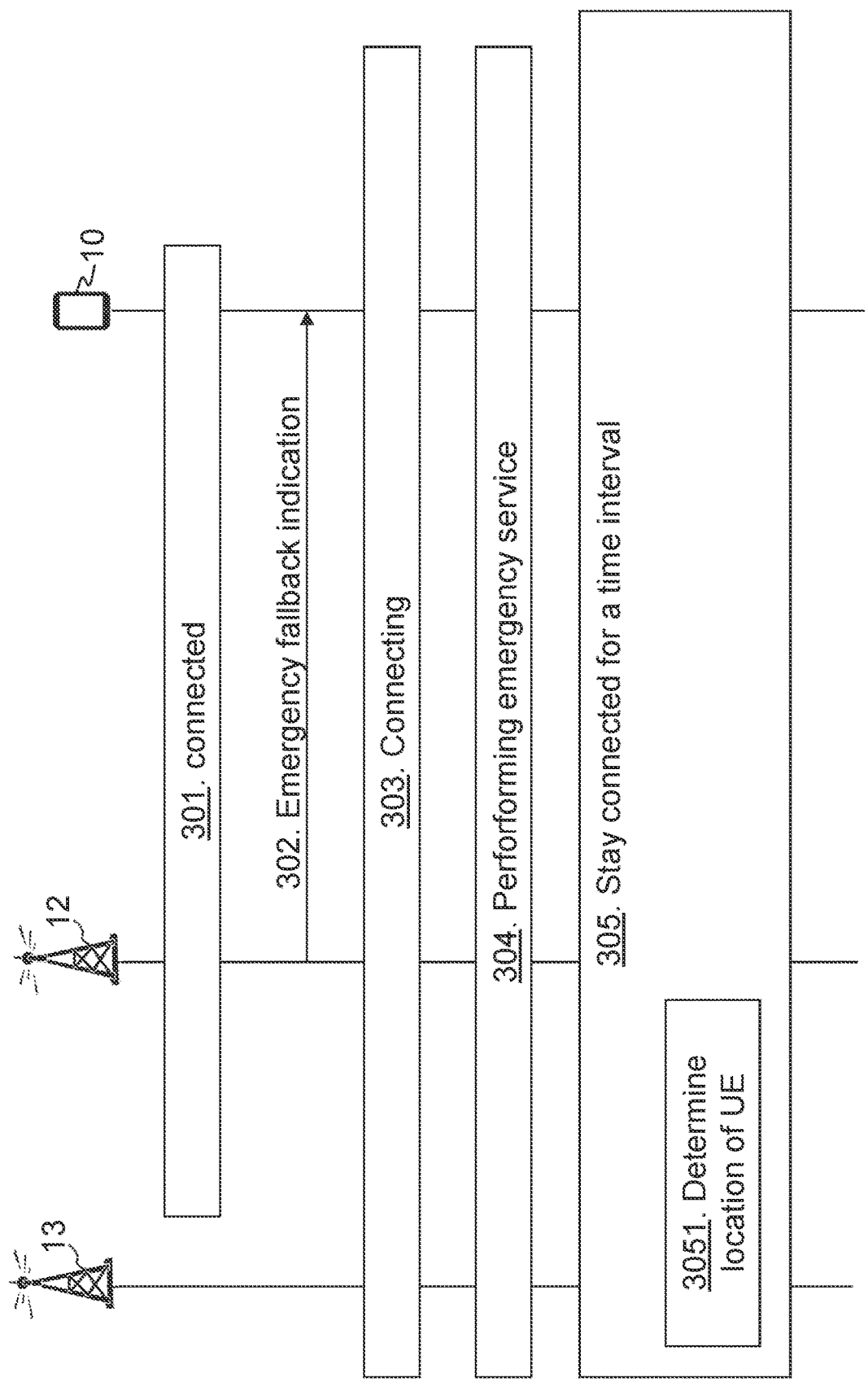
FIG. 3 shows a combined signalling scheme and flowchart according to some embodiments herein.

FIG. 3 is a combined signalling scheme and flowchart according to embodiments herein. In this example the UE is connected to the first RAT.

Action 301. The UE is connected to the first RAT such as NR performing service over the first RAT.

Action 302. The first radio network node may indicate to the UE that the first radio network node does not support an emergency service.

Action 303. The UE performs a fallback to the second RAT. E.g. connects to the second radio network node 13 of the second RAT.

Action 304. The UE further performs the emergency service e.g. making the emergency call at the second RAT.

Action 305. According to embodiments herein the UE is configured to stay connected for a time interval in the second RAT enabling further services to be performed for the UE 10. E.g. services relating to the emergency service such as locating the UE 10.

Action 3051. The second radio network node 13 may e.g. locate or position the UE as long as the UE is connected to the second RAT.

Figure 4:
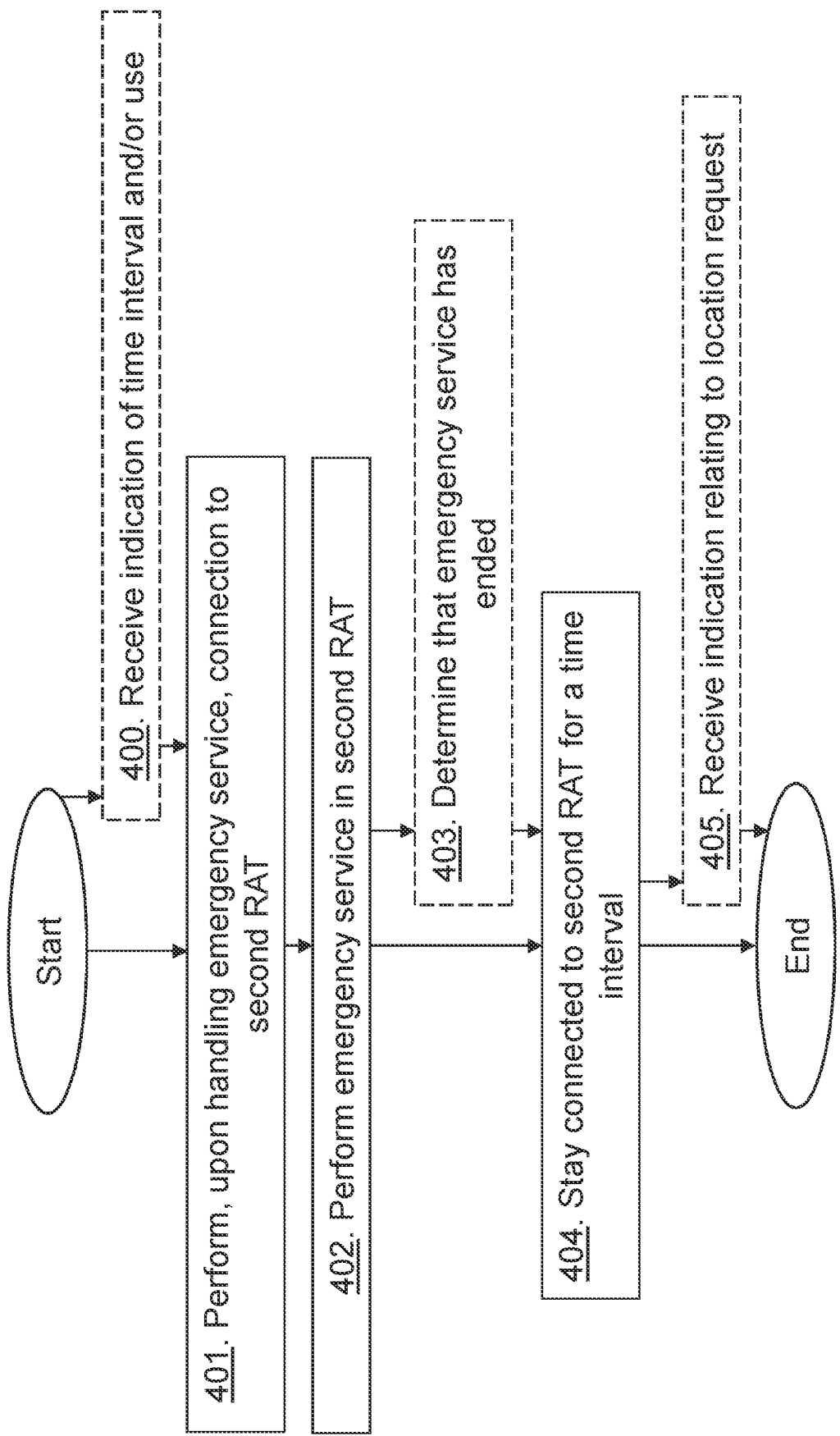
FIG. 4 shows a flowchart depicting a method perform by a user equipment according to embodiments herein.

The method actions performed by the UE 10 for handling a service in a wireless communication network according to embodiments will now be described with reference to a flowchart depicted in FIG. 4. The actions do not have to be taken in the order stated below, but may be taken in any suitable order. Actions performed in some embodiments are marked with dashed boxes.

Action 400. The UE 10 may receive, from a network node, an indication indicating the time interval and/or the use of the time interval. The network node may be a Packet Data Network Gateway and/or a radio network node, and/or the indication may be comprised in a configuration message to the UE 10.

Action 401. The UE 10 performs, upon handling the emergency service e.g. making an emergency call, a connection to the second cell of the second RAT for handling the emergency service. E.g. the UE 10 when being connected to the first cell of the first RAT such as the NR may then perform the connection to a second cell of the second RAT. The first cell may be a cell out of cells of at least the first RAT and the second RAT.

Action 402. The UE 10 performs the emergency service in the second cell of the second RAT.

Action 403. The UE 10 may determine that the emergency service has ended based on: a status of an emergency connection, such as an emergency PDN connection, to the second cell of the second RAT for the UE 10; and/or receiving an indication indicating an end of the emergency service, e.g. receiving an stay on EPS-indication from the PGW and/or an indication that the emergency PDN connection is released.

Action 404. According to embodiments herein the UE 10 stays connected in the second cell of the second RAT for a time interval relating to initiation of the emergency service or finalization of the emergency service. The time interval may be defined by a first time when the emergency service is initialized in the second cell and a second time when the UE initiates a connection back to the first cell or another cell of the first RAT. E.g. a timer is triggered upon initializing the emergency service. The time interval may be defined by a first time associated with finalization of the emergency call and a second time when the UE initiates connection back to the first cell or another cell of the first RAT. The second time thus defines the end of the time interval, when the UE can connect back to the first RAT. The first time may correspond to a time receiving an indication of a release of the emergency connection or an indication that the emergency service is ended. The time interval may be defined by a timer initiated at the first time. The timer may be operator specific, pre-set, dynamically changed or similar. The time interval may be a time interval defined as long as an emergency connection exists in the second cell of the second RAT for the UE 10, e.g. as long as the UE has not received an indication that the emergency connection has been released. The time interval may be preconfigured at the UE 10. The time interval may be started when the UE has performed a fallback to the second cell of the second RAT from the first cell of the first RAT. The timer may be started upon ending an emergency call or a releasing an emergency PDN connection.

Hence, the UE stay a certain time on the second RAT after finishing the emergency call.
1) Time until the emergency connection is released
2) Time until the emergency connection is released plus the time indicated together with the "stay on EPS" indication
3) Operators configured time
4) Fixed time
Shortest value of 1) and 3).

Action 405. The UE 10 may then receive an indication relating to a location request within the second cell of the second RAT.

The UE 10 may then connecting back to the first cell or another cell of the first RAT after the time interval.

It should be noted that this scenario covers a 5G UE that is on 5G Radio, perform fallback to 4G for emergency call and when the emergency call is finalized, the UE stays on 4G until Location/Positioning is done (x seconds). But the UE may alternatively be on 4G Radio, and sets up an 4G emergency call as in legacy 4G but when the emergency call is finalized the UE still stays on 4G for the time interval, even if at the time it is possible to re-select to 5G RAN i.e. the UE has moved into 5G coverage during the emergency call.

It should further be noted that non UE detected Emergency calls on EPS or 5GS refer to scenarios where the user dials a number that the UE does not recognize as emergency number. While there is an option in 3GPP to allow these calls to continue and be connected to Emergency center (without full emergency service treatment in the NW) but the other option is to reject these calls as recognized by IMS with indication that number is an emergency number and then the UE would perform normal emergency procedures. This can also be considered by UE and to stay on EPS per above procedures. If the Non UE detected Emergency call is allowed to proceed, the UE 10 will not be able to recognize the call as emergency.

Figure 5:
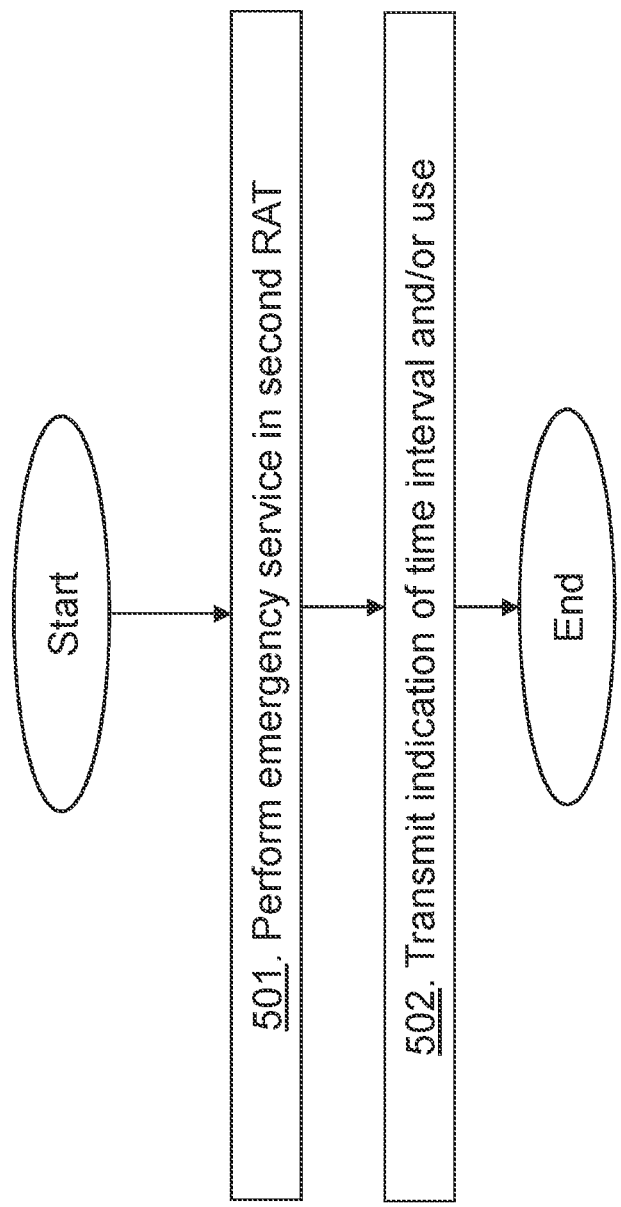
FIG. 5 shows a flowchart depicting a method perform by a network node according to embodiments herein.

The method actions performed by the network node such as the PGW for handling a service for the UE in the wireless communication network according to embodiments will now be described with reference to a flowchart depicted in FIG. 5. The actions do not have to be taken in the order stated below, but may be taken in any suitable order. The network node is associated with the second cell of the second RAT out of cells of at least a first RAT and a second RAT, and the UE is connected to the second cell of the second RAT.

Action 501. The network node performs the emergency service, e.g. the emergency call or notice, for the UE in the second cell of the second RAT.

Action 502. The network node transmits, to the UE, the indication indicating the time interval relating to initiation of the emergency service or finalization of the emergency service, and/or the use of the time interval, wherein the time interval is used by the UE for staying connected in the second cell of the second RAT for the time interval. The indication may be indicating the status of the emergency connection to the second cell of the second RAT for the UE 10; and/or an end of the emergency service. The network node may be a Packet Data Network Gateway and/or a radio network node. The indication may be comprised in the configuration message to the UE 10.

Figure 6:
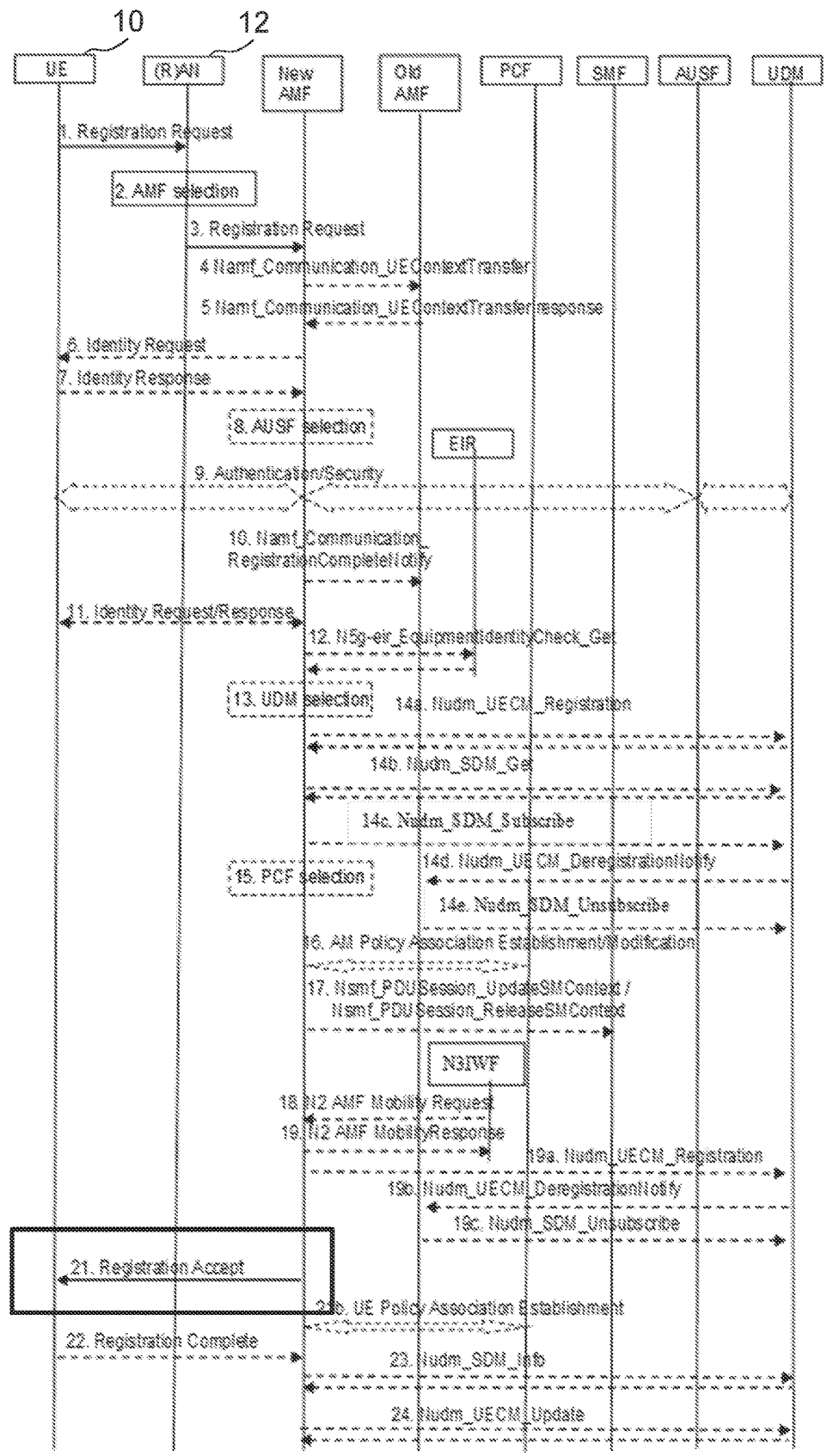
FIG. 6 shows a signalling flow for indicating fallback to EPS.

Following describes in FIG. 6 how the mentioned solution could look like in more details to receive the fallback indicator. UE may receive an emergency fallback indicator during 5GC Registration, in Registration Accept message step 21.

Figure 7A:
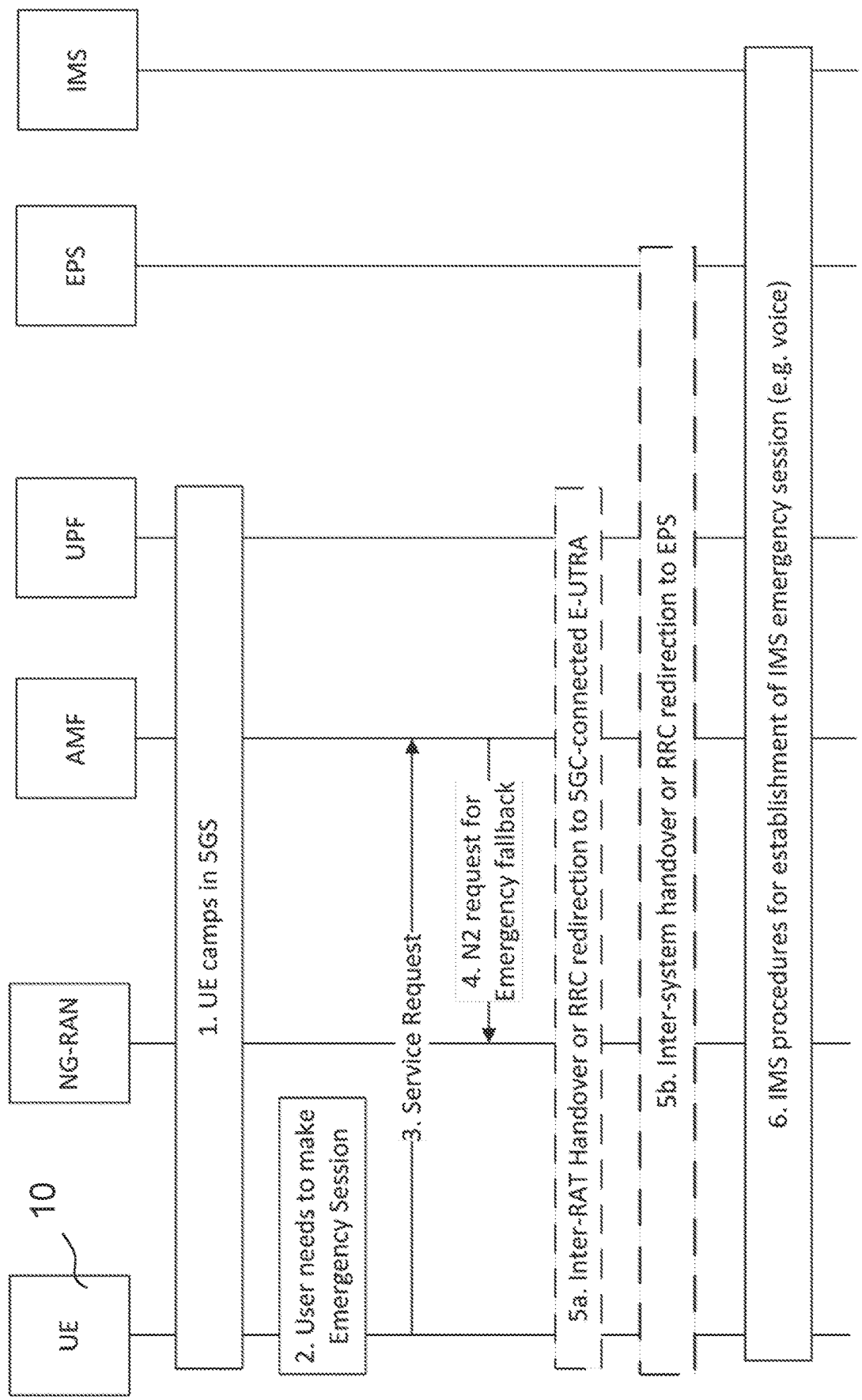
FIGS. 7A-7B show signalling schemes or flows for performing fallback to EPS and also receiving indication of emergency PDN connection release.

Further the UE 10 will perform Service Request procedure for Emergency fallback per below in 23.502, v.16.3.0, see FIG. 7A. Thus, the timer of the time interval may be initiated in step 6 or when step 6 is finalized.

After the Emergency call is finalized, the UE stays on EPS as the UE is moved to EPS network in step 5b.

Based on proposals in this document, the trigger for the UE 10 to stay on EPS may be a single trigger or multiple triggers to cover different scenarios such as:
UE been moved from 5GS to EPS based on Emergency service fallback (above call flow);
5GS UE may be camping on EPS and placed an emergency call but stays on EPS for a configured timer/as long as the Emergency PDN connection exists;
The emergency PDN connection when released will also carry indication to UE to stay in EPS for x seconds.

Figure 7B:
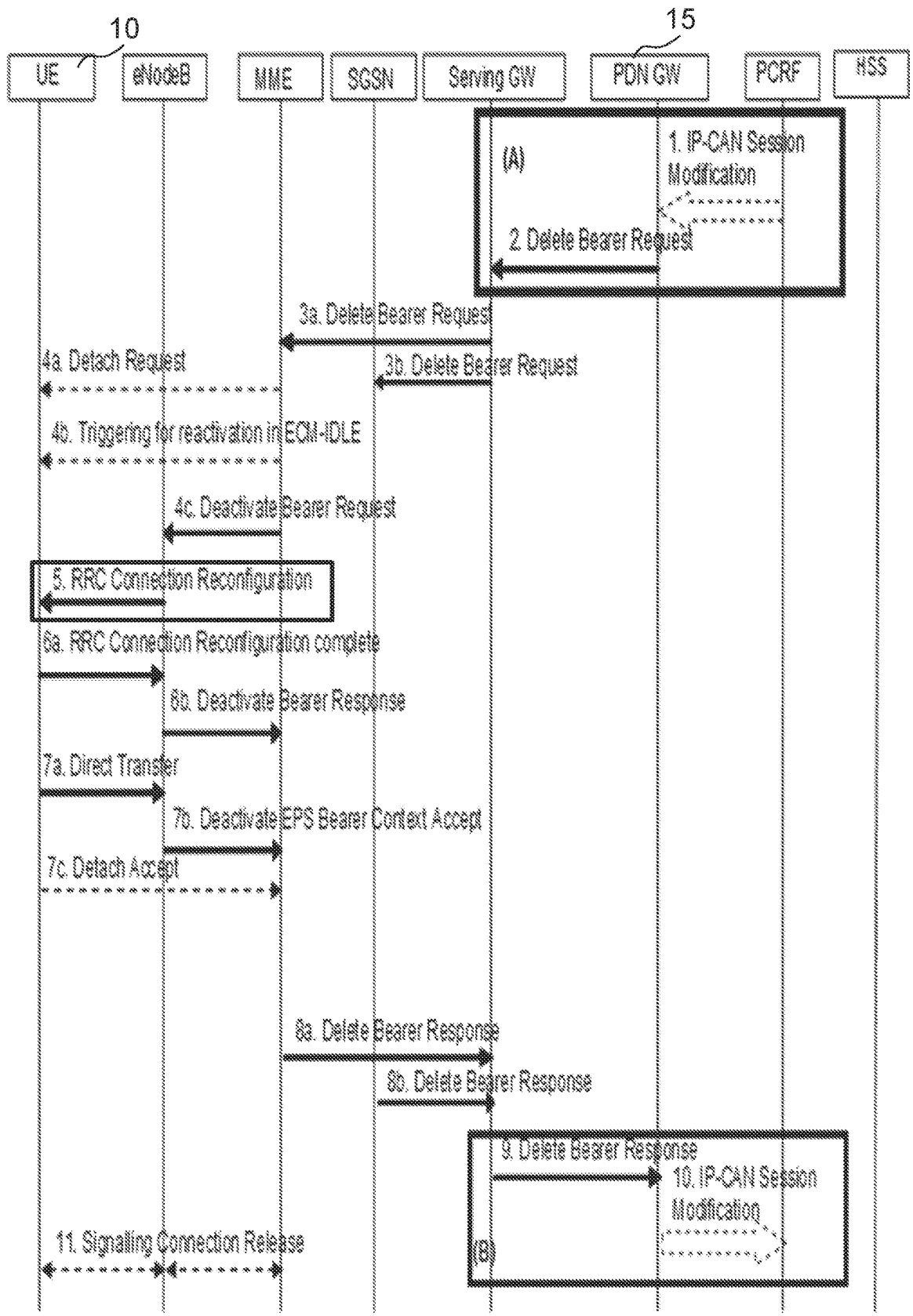

The following flow shows PDN GW initiated bearer deactivation from TS 23.401, v.16.3.0, section 5.4.4.1, see FIG. 7B. This is related to action The UE according to embodiments herein may be informed that the emergency PDN connection is released. The PDN GW may include in step 2 the "stay on EPS" indication, optionally with a timer. This "stay on EPS" indication is carried to SGW, to MME (3a) and to eNB (4c). The eNB provides the "stay on EPS" indication in step 5 to the UE.

Figure 8:
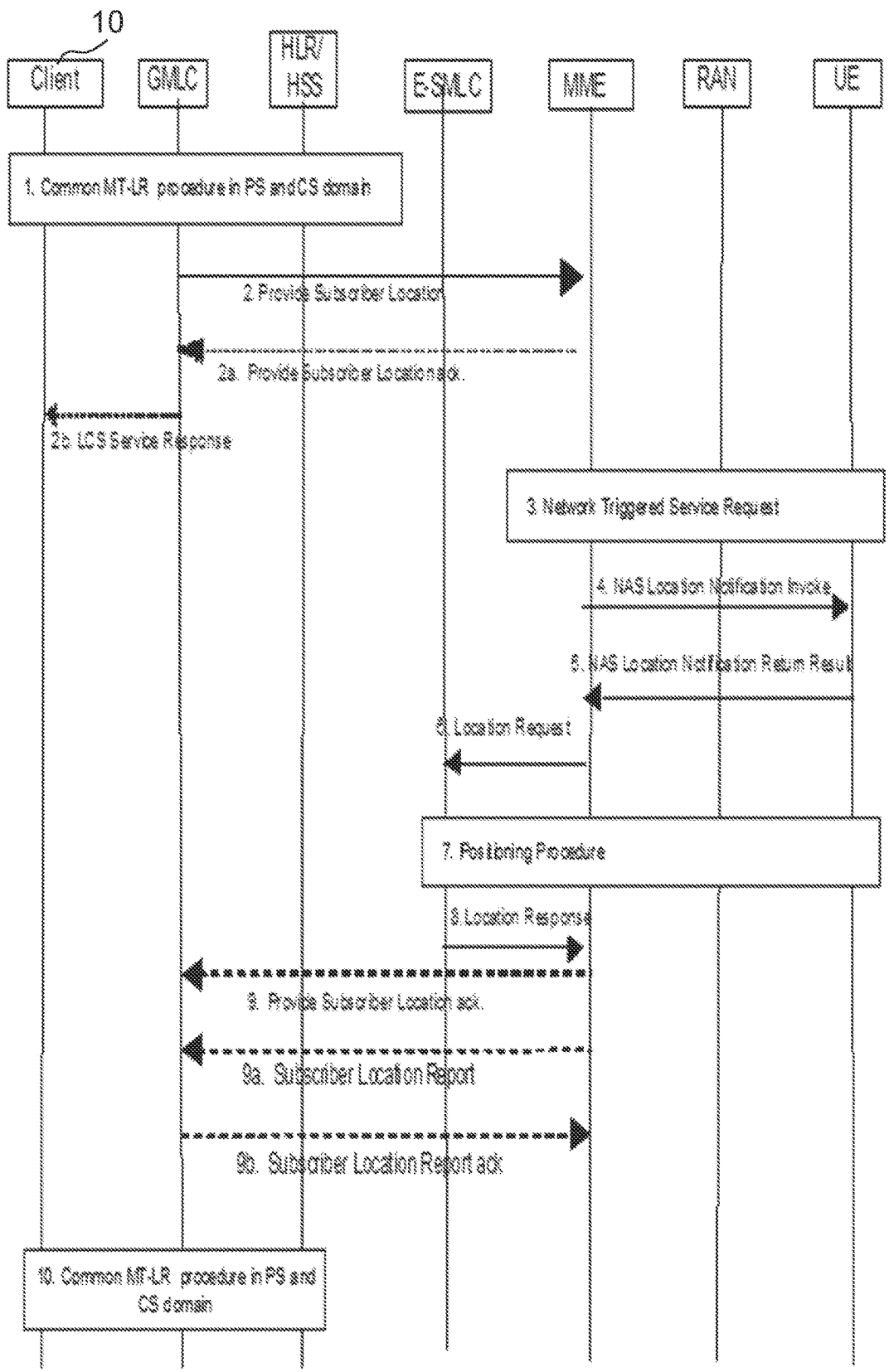
FIG. 8 shows a signalling scheme for performing a location service in EPS.

The UE according to embodiments herein stays for e.g. x seconds on the second RAT such as EPS enabling the emergency center to perform successful e.g. Location query on EPS, e.g. following procedures in 23.217, v.16.3.0, section 9.1.15; section 9.1.16, see FIG. 8.

Figure 9:
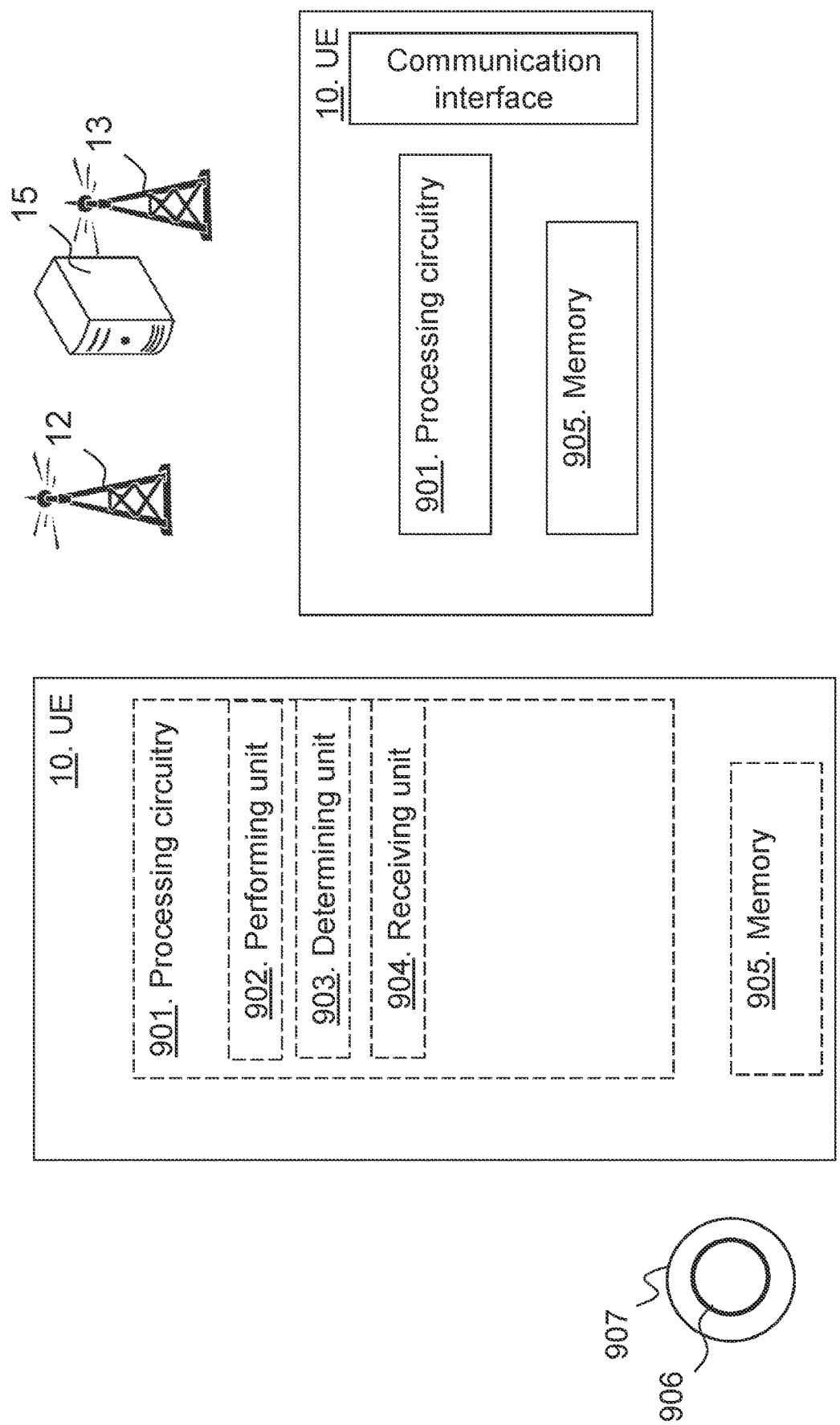
FIG. 9 shows a user equipment according to embodiments herein.

FIG. 9 is a block diagram depicting the UE 10 for handling a service in the wireless communication network 1 according to embodiments herein.

The UE 10 may comprise processing circuitry 901, e.g. one or more processors, configured to perform the methods herein.

The UE 10 may comprise a performing unit 902. The UE 10, the processing circuitry 901 and/or the performing unit 902 is configured to perform, upon handling the emergency service, the connection to the second cell of the second RAT for handling the emergency service. The UE 10, the processing circuitry 901 and/or the performing unit 902 is further configured to perform the emergency service in the second cell of the second RAT. The UE 10, the processing circuitry 901 and/or the performing unit 902 is further configured to stay connected in the second cell of the second RAT for the time interval relating to initiation of the emergency service or finalization of the emergency service. The UE 10 may be connected to the first cell of the first RAT and then configured to perform the connection to a second cell of the second RAT. The time interval may be defined by the first time when the emergency service is initialized in the second cell and the second time when the UE initiates the connection back to the first cell or another cell of the first RAT. The time interval may be defined by the first time associated with finalization of the emergency call and the second time when the UE initiates connection back to the first cell or another cell of the first RAT. The first time may correspond to the time receiving the indication of the release of the emergency connection. The time interval may be defined by a timer initiated at the first time.

The UE 10 may comprise a determining unit 903. The UE 10, the processing circuitry 901 and/or the determining unit 903 may be configured to determine that the emergency service has ended based on: a status of an emergency connection to the second cell of the second RAT for the UE 10; and/or receiving an indication indicating an end of the emergency service. The time interval may be a time interval defined or running as long as an emergency connection exists in the second cell of the second RAT for the UE 10. The time interval may be preconfigured at the UE 10. The time interval may be started when the UE has performed a fallback to the second cell of the second RAT from the first cell of the first RAT.

The UE 10 may comprise a receiving unit 904, e.g. a receiver or a transceiver. The UE 10, the processing circuitry 901 and/or the receiving unit 904 may be configured to receive the indication relating to a location request within the second cell of the second RAT. The UE 10, the processing circuitry 901 and/or the receiving unit 904 may be configured to receive, from the network node, the indication indicating the time interval and/or the use of the time interval. The network node may be a PGW and/or a radio network node. The indication may be comprised in a configuration message to the UE 10.

The UE 10 further comprises a memory 905. The memory comprises one or more units to be used to store data on, such as indications, time intervals, strengths or qualities, grants, indications, reconfiguration, configuration, values, scheduling information, timers, applications to perform the methods disclosed herein when being executed, and similar. The UE 10 comprises a communication interface comprising transmitter, receiver, transceiver and/or one or more antennas.

The methods according to the embodiments described herein for the UE 10 are respectively implemented by means of e.g. a computer program product 906 or a computer program product, comprising instructions, i.e., software code portions, which, when executed on at least one processor, cause the at least one processor to carry out the actions described herein, as performed by the UE 10. The computer program product 906 may be stored on a computer-readable storage medium 907, e.g. a universal serial bus (USB) stick, a disc or similar. The computer-readable storage medium 907, having stored thereon the computer program product, may comprise the instructions which, when executed on at least one processor, cause the at least one processor to carry out the actions described herein, as performed by the UE 10. In some embodiments, the computer-readable storage medium may be a non-transitory or transitory computer-readable storage medium.

Figure 10:
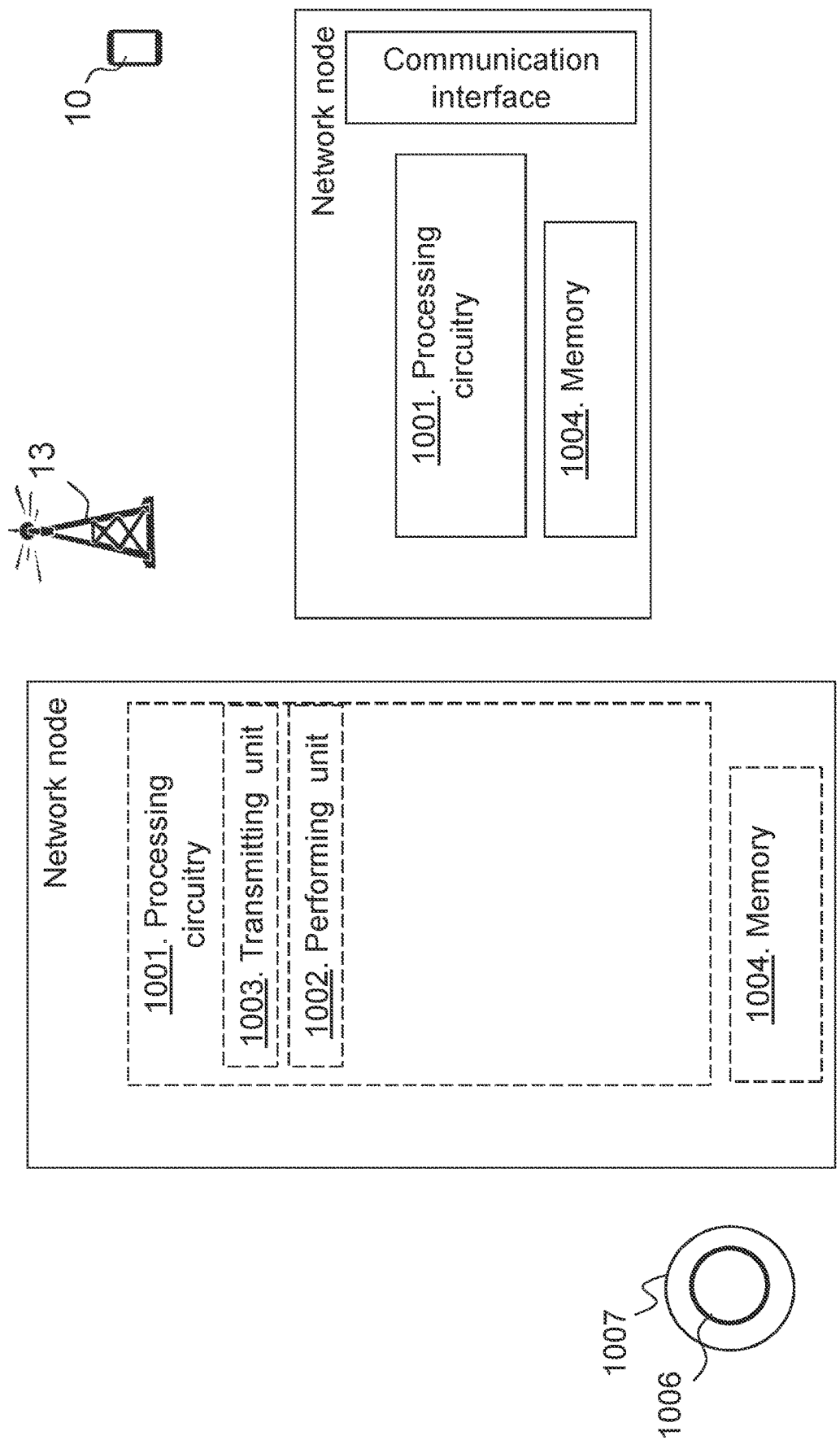
FIG. 10 shows a network node according to embodiments herein.

FIG. 10 is a block diagram depicting the network node, in two embodiments, for handling the service for the UE, in the wireless communication network 1 according to embodiments herein. The network node is associated with the second cell of the second RAT out of cells of at least the first RAT and the second RAT. The UE is connected to the second cell of the second RAT.

The network node may comprise processing circuitry 1001, e.g. one or more processors, configured to perform the methods herein.

The network node may comprise a performing unit 1002. The network node, the processing circuitry 1001 and/or the performing unit 1003 is configured to perform the emergency service for the UE in the second cell of the second RAT.

The network node may comprise a transmitting unit 1003, e.g. a transmitter or a transceiver. The network node, the processing circuitry 1001 and/or the transmitting unit 1003 is configured to transmit to the UE, the indication indicating the time interval relating to initiation of the emergency service or finalization of the emergency service, and/or the use of the time interval, wherein the time interval is used by the UE for staying connected in the second cell of the second RAT for the time interval. The indication may be indicating the status of the emergency connection to the second cell of the second RAT for the UE 10; and/or an end of the emergency service. The network node may be a PGW and/or a radio network node. The indication may be comprised in a configuration message to the UE 10.

The network node further comprises a memory 1004. The memory comprises one or more units to be used to store data on, such as indications, strengths or qualities, grants, messages, execution conditions, user data, reconfiguration, configurations, scheduling information, timers, applications to perform the methods disclosed herein when being executed, and similar. The network node comprises a communication interface comprising transmitter, receiver, transceiver and/or one or more antennas.

The methods according to the embodiments described herein for the network node are respectively implemented by means of e.g. a computer program product 1006 or a computer program product, comprising instructions, i.e., software code portions, which, when executed on at least one processor, cause the at least one processor to carry out the actions described herein, as performed by the network node. The computer program product 1006 may be stored on a computer-readable storage medium 1007, e.g. a universal serial bus (USB) stick, a disc or similar. The computer-readable storage medium 1007, having stored thereon the computer program product, may comprise the instructions which, when executed on at least one processor, cause the at least one processor to carry out the actions described herein, as performed by the network node. In some embodiments, the computer-readable storage medium may be a non-transitory or transitory computer-readable storage medium.

In some embodiments a more general term "network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), gateways, transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 11:
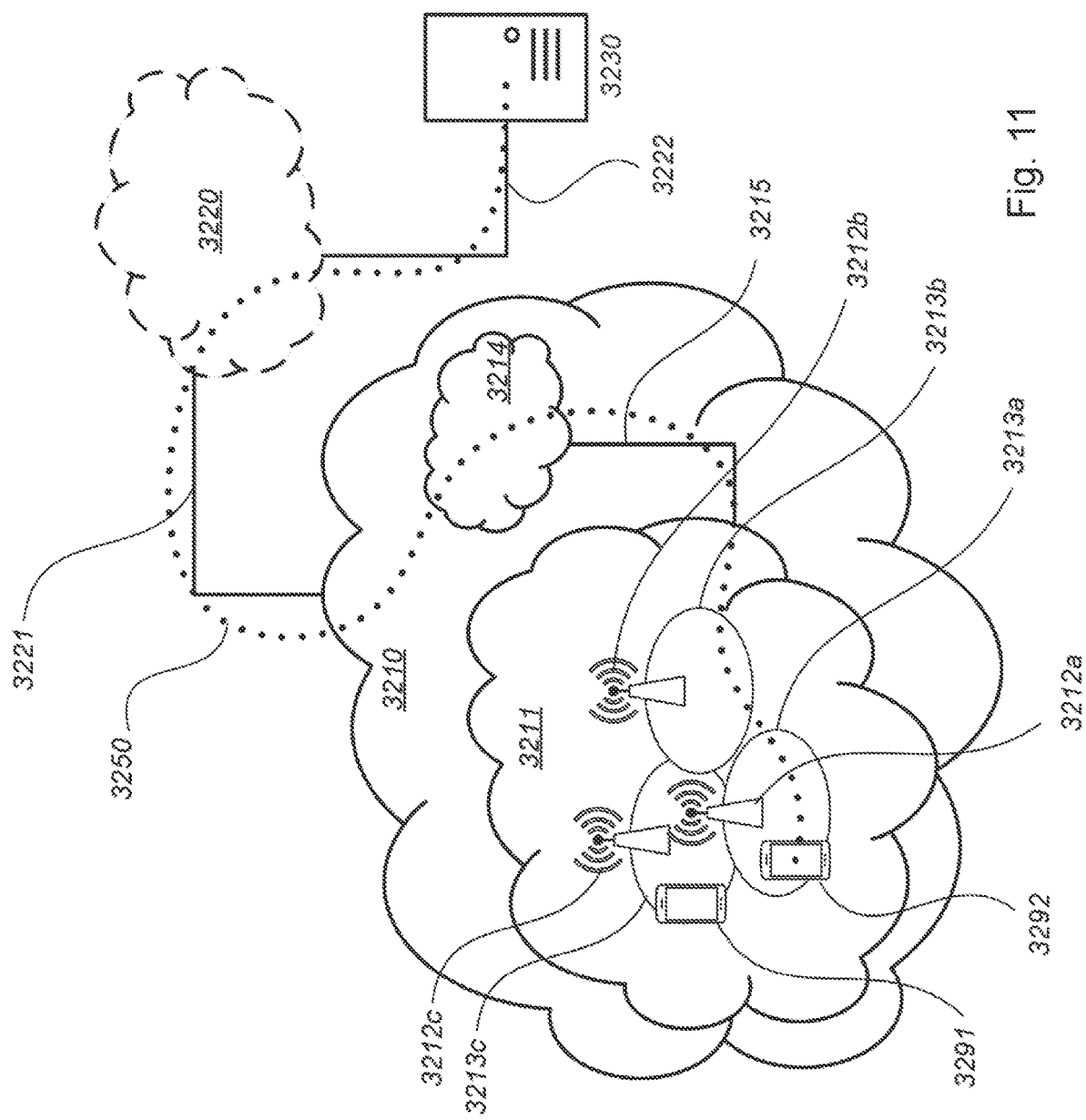
FIG. 11 shows a telecommunication network connected via an intermediate network to a host computer in accordance with some embodiments.

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
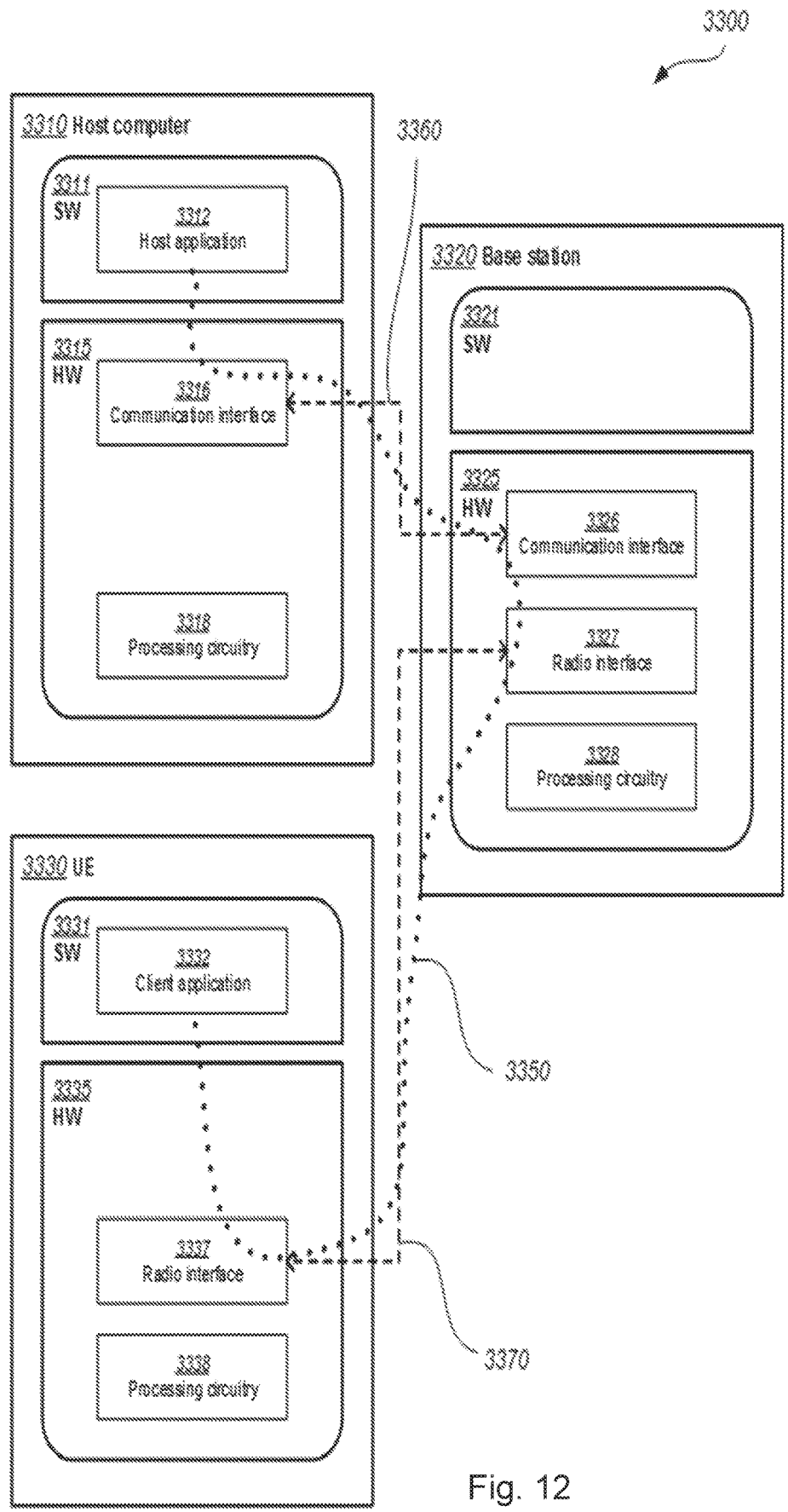
FIG. 12 shows a host computer communicating via a base station with a user equipment over a partially wireless connection in accordance with some embodiments.

It is noted that the host computer 3310, base station 3320 and UE 3330 illustrated in FIG. 12 may be identical to the host computer 3230, one of the base stations 3212*a*, 3212*b*, 3212*c* and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may enable location of the UE for a service relating to an emergency service and thereby provide benefits such as improved user experience and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

| Abbreviation | Explanation |
| --- | --- |
| 3GPP | 3rd Generation Partnership Project |
| 5G | 5th Generation |
| 5GS | 5G System |
| 5GC | 5G Core network |
| CHO | Conditional Handover |
| CR | Change Request |
| DAPS | Dual Active Protocol Stack |
| DRB | Data Radio Bearer |
| E-UTRAN | Evolved Universal Terrestrial Access Network |
| gNB | 5G Node B |
| HO | Handover |
| LTE | Long-term Evolution |
| NG | The interface/reference point between the RAN and the CN in 5G/NR. |
| NG-C | The control plane part of NG (between a gNB and an AMF). |
| NG-U | The user plane part of NG (between a gNB and a UPF). |
| NG-RAN | Next Generation Radio Access Network |
| NR | New Radio |
| PDCP | Packet Data Convergence Protocol |
| PDU | Protocol Data Unit |
| RAN | Radio Access Network |
| RB | Radio Bearer |
| RLC | Radio Link Control |
| ROHC | Robust Header Compression |
| RRC | Radio Resource Control |
| SDU | Service Data Unit |
| SGW | Serving Gateway |
| SN | Sequence Number |
| TS | Technical Specification |
| UE | User Equipment |
| UL | Uplink |
| UPF | User Plane Function |
| Xn | The interface/reference point between two gNBs |

REFERENCES

[1] 3GPP TS 22.261 v. 17.0.0 Service requirements for the 5G system; Stage 1 (Release 17)
[2] 3GPP TS 23.501 v.16.3.0 System Architecture for the 5G System (5GS); Stage 2 (Release 16)
[3] 3GPP TS 23.502 v.16.3.0 Technical Specification Group Services and System Aspects; Procedures for the 5G System; Stage 2 (Release 16), v16.3.0

The invention claimed is:

1. A method performed by a user equipment, UE, for handling a service in a wireless communication network, the method comprising:
    upon handling an emergency service, performing a connection to a second cell of a second radio access technology, RAT, for handling the emergency service;
    performing the emergency service in the second cell of the second RAT;
    staying connected in the second cell of the second RAT for a time interval relating to initiation of the emergency service or finalization of the emergency service; and
    receiving, from a network node, an indication indicating a status of an emergency connection to the second cell of the second RAT for the UE and/or an end of the emergency service.

2. The method according to claim 1, wherein the UE is connected to a first cell of a first radio access technology, RAT, and then performing the connection to a second cell of the second RAT.

3. The method according to claim 2, wherein the time interval is defined by a first time when the emergency service is initialized in the second cell and a second time when the UE initiates a connection back to the first cell or another cell of the first RAT.

4. The method according to claim 3, wherein the time interval is defined by a timer initiated at the first time.

5. The method according to claim 2, wherein the time interval is defined by a first time associated with finalization of the emergency call and a second time when the UE initiates connection back to the first cell or another cell of the first RAT.

6. The method according to claim 5, wherein the first time corresponds to a time receiving an indication of a release of the emergency connection.

7. The method according to claim 1, further comprising
determining that the emergency service has ended based on the indication indicating the status of the emergency connection to the second cell of the second RAT for the UE and/or the end of the emergency service.

8. The method according to claim 1, further comprising
receiving an indication relating to a location request within the second cell of the second RAT.

9. The method according to claim 1, wherein the time interval is a time interval defined as long as an emergency connection exists in the second cell of the second RAT for the UE.

10. The method according to claim 1, wherein the time interval is preconfigured at the UE.

11. The method according to claim 1, wherein the time interval is started when the UE has performed a fallback to the second cell of the second RAT from the first cell of the first RAT.

12. The method according to claim 1, further comprising
receiving, from the network node, an indication indicating the time interval and/or the use of the time interval.

13. The method according to claim 12, wherein the indication is comprised in a configuration message to the UE.

14. The method according to claim 1, wherein the network node is Packet Data Network Gateway and/or a radio network node.

15. A method performed by a network node for handling a service for a user equipment, UE, in a wireless communication network; wherein the network node is associated with a second cell of a second radio access technology, RAT, out of cells of at least a first RAT and the second RAT, and wherein the UE is connected to the second cell of the second RAT, the method comprising performing an emergency service for the UE in the second cell of the second RAT; and transmitting, to the UE, an indication indicating a time interval relating to initiation of the emergency service or finalization of the emergency service, and/or the use of the time interval, wherein the time interval is used by the UE for staying connected in the second cell of the second RAT for the time interval, wherein the indication further indicates a status of an emergency connection to the second cell of the second RAT for the UE and/or an end of the emergency service.

16. The method according to claim 15, wherein the network node is Packet Data Network Gateway and/or a radio network node.

17. The method according to claim 15, further wherein the indication is comprised in a configuration message to the UE.

18. A user equipment, UE, for handling a service in a wireless communication network, wherein the UE is configured to:
perform, upon handling an emergency service, a connection to a second cell of a second radio access technology, RAT, for handling the emergency service;
perform the emergency service in the second cell of the second RAT;
stay connected in the second cell of the second RAT for a time interval relating to initiation of the emergency service or finalization of the emergency service; and
receive, from a network node, an indication indicating a status of an emergency connection to the second cell of the second RAT for the UE and/or an end of the emergency service.

19. The UE according to claim 18, wherein the UE is connected to a first cell of a first radio access technology, RAT, and then configured to perform the connection to a second cell of the second RAT.

20. The UE according to claim 19, wherein the time interval is defined by a first time when the emergency service is initialized in the second cell and a second time when the UE initiates a connection back to the first cell or another cell of the first RAT.

* * * * *